United States Patent [19]

Murakami et al.

[11] Patent Number: 5,989,381
[45] Date of Patent: Nov. 23, 1999

[54] METHOD FOR ADHESIVE BONDING OF AN OVERLAY FILM TO AN ACRYLIC RESIN BOARD

[75] Inventors: Hideyuki Murakami, Sayama; Yusaku Uryu, Nagareyama; Akira Hori, Higashimatsuyama; Yasuhiro Matsuo, Ageo; Ryuichi Edasaki, Akashi, all of Japan

[73] Assignee: C.I. Kasei Co., Ltd., Tokyo, Japan

[21] Appl. No.: 08/096,516

[22] Filed: Jul. 23, 1993

[30] Foreign Application Priority Data

Jul. 30, 1992 [JP] Japan .................................. 4-222198

[51] Int. Cl.$^6$ ...................................................... B32B 31/00
[52] U.S. Cl. ........................... 156/281; 156/235; 156/322; 156/324.4; 264/345; 264/346
[58] Field of Search ..................................... 156/235, 281, 156/322, 324.4; 264/345, 346

[56] References Cited

U.S. PATENT DOCUMENTS 2,451,597  10/1948  Wheeler ................................... 156/281
2,464,826   3/1949  Neuer et al. ............................. 156/322

*Primary Examiner*—John J. Gallagher

[57] ABSTRACT

An improvement is proposed in the method for adhesively bonding a decorative overlay film of a plastic resin to the surface of an acrylic resin board with a hot-melt adhesive, by which the overlaid acrylic resin board can be imparted with greatly improved stability of overlaying lamination as well as good machining workability of the board. The improved method comprises the steps of: (a) demoisturizing the acrylic resin board by heating at 60–90° C. for at least 2 hours; (b) forming a layer of a hot-melt adhesive on at least either one of the resin board and the overlay film; (c) laminating the resin board and the overlay film with the adhesive layer therebetween to obtain a laminate by passing between a pair of laminating rollers while the surfaces to be brought into contact with each other are kept at an elevated temperature; and (d) subjecting the laminate to an aging treatment by heating at 30–60° C. for at least 1 hour.

8 Claims, No Drawings

METHOD FOR ADHESIVE BONDING OF AN OVERLAY FILM TO AN ACRYLIC RESIN BOARD

BACKGROUND OF THE INVENTION

The present invention relates to a method for adhesive bonding of an overlay film to an acrylic resin board. More particularly, the invention relates to an improved method for adhesive bonding of a decorative overlay film of a plastic resin to an acrylic resin board by using a hot-melt adhesive to give a decorative acrylic resin-based overlaid board having improved stability of overlaying lamination in a prolonged service under adverse ambient conditions or in mechanical working.

As is well known, acrylic resins have various excellent properties such as high clarity, mechanical strengths, dimensional stability in molding and the like so that they are used in a wide field of applications not only as a material of parts of various instruments and machines but also as a material of various kinds of indoor and outdoor utilities such as, for example, doors, partition boards, arcade roofs, signboards, doorplates, telephone booths and so on, in most cases, in the form of a board having a thickness in a wide range from less than 1 mm to several centimeters.

When decorativeness or a shielding effect to light or heat radiation is desired in these acrylic resin boards not obtained with a plain resin board, it is a conventional technology that the acrylic resin board is overlaid with an overlay film of a plastic resin provided with a designed pattern by printing, with a metallic layer over whole surface or in a pattern by sputtering, vapor deposition or other suitable methods and with an embossment. The acrylic resin board and the overlay film are bonded together usually by using a hot-melt adhesive in consideration of the workability of the laminated resin board in the subsequent works such as thermal shaping or mechanical working, e.g., bending, cutting, sawing, drilling, shaving and the like.

A problem in such an overlaid acrylic resin board is that the adhesive bonding between the resin board and the overlay film by use of a hot-melt adhesive is not always very reliable in respect of stability of bonding in the subsequent works of the overlaid board or during a prolonged service of the utilities made from the overlaid acrylic resin board, especially, under very adverse ambient conditions. For example, delamination of the layers may eventually be caused in the mechanical working such as sawing and shaving for trimming of the periphery. Further, blistering of the overlay film is sometimes found in the overlaid acrylic resin board when it is prolongedly exposed to direct sunlight as is unavoidable in outdoor utilities. The requirements for overlaid acrylic resin boards include, for example, resistance against crazing, resistance against organic solvents and plasticizers, stability against blistering, adaptability to thermal forming, bendability to comply with a curved surface, adaptability to job-site mechanical working such as drilling, and so on. Various proposals and attempts, of course, have been made to solve the above mentioned problems relative to the improvement in the stability of overlaying lamination and to satisfy the various requirements mentioned above in overlaid acrylic resin boards but none of the prior art methods is quite satisfactory having its own merits and demerits.

SUMMARY OF THE INVENTION

The present invention accordingly has an object to provide a novel and improved method for adhesively bonding an overlay film of a plastic resin to an acrylic resin board by using a hot-melt adhesive to prepare an overlaid acrylic resin board by which the above described problems in the prior art methods can be solved in respect of the stability of overlaying lamination.

Thus, the method of the present invention for adhesively bonding an overlay film of a plastic resin to the surface of an acrylic resin board with a hot-melt adhesive to prepare an overlaid acrylic resin board comprises the steps of:

(a) heating the acrylic resin board at a temperature in the range from 50 to 100° C. or, preferably, from 60 to 90° C. for a length of time of at least two hours;

(b) forming a layer of a hot-melt adhesive on the surface of either one or both of the acrylic resin board and a plastic resin-made overlay film;

(c) bringing the acrylic resin board and the overlay film into contact with each other under pressure, the layer of the hot-melt adhesive on the resin board or on the overlay film facing the other, while at least either one of the surfaces to be brought into contact with each other is at a temperature higher than the softening point of the adhesive but not exceeding the softening point of the acrylic resin board or the plastic resin overlay film, to give a laminate of the resin board and the overlay film; and (d) keeping the laminate at a temperature in the range from 30 to 60° C. or, preferably, from 40 to 50° C. for at least 1 hour to effect aging.

DETAILED DESCRIPTION OF THE PREFERRED EMBODIMENTS

As is described above, the inventive method, which is applicable to any acrylic resin boards irrespective of the grade thereof, comprises the essential steps (a) to (d) in combination, of which the step (a) has an effect of demoisturization or drying of the acrylic resin board and the step (d) has an effect of aging of the laminate consisting of the acrylic resin board, an overlay film and an adhesive layer intervening therebetween while the conditions in the step (c) are important to achieve reliable adhesive bonding.

It is a well known fact that acrylic resins in general are relatively hygroscopic or moisture-absorbing so that the heating step for demoisturization, i.e. step (a), is essential in the inventive method in order to ensure reliableness of adhesive bonding since otherwise the adhesive bonding strength between the resin board and the overlay film is decreased or the overlaid acrylic resin board is subject to occurrence of blisters or other defects when the overlaid resin board is used under adverse ambient conditions as in direct sunlight.

The temperature of heating in step (a) is in the range from 50 to 100° C. or, preferably, from 60 to 90° C. since, when the temperature is too low, no effective demoisturization can be effected while, when the temperature is too high, the resin board under treatment is subject to a risk of thermal deformation as a consequence of heating at such a high temperature as to be close to the softening point of the acrylic resin which is usually about 100° C. though dependent on the grades of the acrylic resin.

The length of time for this heat treatment in step (a) should be at least two hours. No particular additional advantages are obtained by extending this time to exceed, for example, 24 hours rather with a disadvantage due to a decrease in the productivity of the process. The optimum length of time naturally depends on the thickness of the acrylic resin board which ranges from less than 1 millimeter to several centimeters depending on the intended application of the overlaid resin board. In practice, a number of acrylic resin boards are kept in a room at a controlled temperature for a specified length of time to effect demoisturization by being held upright or by being laid flat one on the other although it is desirable that each of the resin boards as cut in a unit size is not in direct contact with the adjacent ones by using suitable spacers in-between in order to accelerate demoisturization. It is of course that the inventive method is not inapplicable to a continuous-length acrylic resin sheet in a rolled form.

As to the overlay film to be laminated with the acrylic resin board, various plastic resins are known to be suitable as the material of the overlay film including, for example, polyvinyl chloride resins, polyethylene terephthalate resins, acrylic resins, polyvinylidene fluoride resins, polystyrene resins, polycarbonate resins and the like without particular limitations. If desired, the overlay film itself is a laminated film consisting of two or more base films of different plastic resins. It is usual but not essential that the overlay film is imparted with decorativeness with a decoratively designed pattern formed by printing or with embossed or matted surface or imparted with a light-shielding effect by forming a metallic coating layer of aluminum or other metals or alloys partially or over the whole surface by sputtering, vapor deposition or other suitable method. The overlay film has a thickness, usually, in the range from 12 to 500 $\mu$m though not particularly limitative depending on the particular purpose of overlaying lamination.

In step (b) of the inventive method, a layer of a hot-melt adhesive is formed on the surface of either one or both of the acrylic resin board and the plastic-made overlay film. When the adhesive layer is formed on the acrylic resin board, the adhesive layer can be formed either before or after the heat treatment of the resin board in step (a) but it is preferable to undertake this step (b) after a substantial decrease in the temperature of the resin board heated in step (a) at an elevated temperature in order to facilitate handling of the resin board. Various kinds of hot-melt adhesives can be used in the inventive method but those based on an acrylic resin or polyester resin are preferable. Examples of particularly preferable hot-melt adhesives include a partially crosslinked polymer of an alkyl ester of (meth)acrylic acid having a weight-average molecular weight in the range from 20,000 to 2,000,000, of which the number of carbon atoms in the alkyl group does not exceed 5, with a degree of crosslinking of 5 to 80% and those based on an uncrosslinked polyester resin, acrylic resin and urethane resin or, more preferably, acrylic resin having a glass transition point in the range from 10 to 105° C. or, preferably, from 25 to 80° C. The hot-melt adhesives usually have a heat-activation temperature in the range from 30 to 130° C. It is desirable that the hot-melt adhesive used here exhibits an adhesive bonding strength of at least 2 kgf/25 mm by the peeling test within a temperature range of 10 to 60° C. and at least 50% of this initial adhesive bonding strength can be retained after an aging acceleration test at 70° C. for 30 days without being affected by the migration of the plasticizer or other ingredients contained in the plastic-made overlay film. When the adhesive bonding work is conducted according to the inventive method, any of the above named hot-melt adhesives can satisfy these requirements. It is optional according to need that the hot-melt adhesive is admixed with various kinds of known additives such as ultraviolet absorbers, flame-retardant agents, coloring agents, antioxidants and the like.

The procedure for forming a layer of the hot-melt adhesive on the surface of the acrylic resin board and/or the overlay film is not particularly limitative and can be conventional. For example, a melt of the hot-melt adhesive can be applied to the surface by using a roller coater or other suitable coating machines. A more convenient way for forming an adhesive layer is to use a pre-formed hot-melt adhesive resin sheet carried on a surface-releasable substrate sheet available on the market. Namely, such an adhesive layer carried on a release sheet is brought into contact with the surface of the resin board or overlay film and they are passed together between a pair of laminating rollers at an elevated temperature so that the hot-melt adhesive at least partially softened is transferred and bonded to the surface followed by removal of the surface-releasable sheet by peeling to form a layer of the adhesive on the surface of the resin board or overlay film. The thickness of the adhesive layer or the total thickness of the adhesive layers, when adhesive layers are formed on both of the resin board and the overlay film, is in the range from 5 to 200 $\mu$m or, preferably, in the range from 15 to 150 $\mu$m. When the adhesive layer is formed on the surface of only either one of the resin board and the overlay film, it is preferable that the overlay film is provided with the adhesive layer.

The next step to follow, i.e. step (c), is the step for adhesively bonding the resin board and the overlay film with the layer of the hot-melt adhesive intervening therebetween. Namely, the resin board and the overlay film are laid one on the other with the adhesive layer formed on one of them facing the other and brought into contact under a pressure. Practically, the resin board and the overlay film laid one on the other are passed together between a pair of laminating rollers under an adequate line pressure. The laminating rollers are preferably rubber rollers having a relatively low hardness so that, even when the overlay film has an embossment work, no deformation or collapsing is caused in the form of the embossment. The line pressure of the laminating rollers is in the range from 0.1 to 50 kgf/cm or, preferably, from 1 to 20 kgf/cm though dependent on various factors. When the overlay film has an embossment work, the line pressure of the laminating rollers should not be too high. The velocity of laminating work is not particularly limitative but, preferably, should not exceed 10 meters/minute or, more preferably, 5 meters/minute in view of possible entrainment of air.

It is desirable that the laminating work of this step (c) is undertaken before lapse of an unduly long time after completion of the heat treatment of the resin board in step (a) since, if the resin board after step (a) is kept for an overly long time in an atmospheric air, re-absorption of moisture unavoidably proceeds in the once demoisturized resin board to cancel the effect obtained in step (a). In this regard, it is desirable that the laminating work in step (c) is undertaken within 6 hours or, preferably, within 3 hours after completion of the heat treatment of the resin board in step (a) although the resin board immediately after step (a) is still at a too high temperature to be easily handled.

It is important in this laminating work that the materials passed between the laminating rollers are under controlled temperatures. Namely, at least either one of the surfaces to be brought into contact with each other should be at a temperature higher than the softening point of the hot-melt adhesive. For example, the surface of the hot-melt adhesive layer or at least one of the adhesive layers, when both of the resin board and the overlay film are provided each with an adhesive layer, should be at a temperature higher than the softening point of the hot-melt adhesive. On the other hand, the rest of the surfaces to be brought into contact each with the other, which is provided or not provided with the hot-melt adhesive layer, is not required at such a temperature condition. It is, however, undesirable that the temperature of the surface is excessively low as compared with the softening point of the hot-melt adhesive since, if the surface is too cold, the softened hot-melt adhesive brought into contact with such a cold surface is immediately solidified not to exhibit good adhesive bonding effect. In this regard, the surface, with which the softened or molten hot-melt adhesive layer is brought into contact, should be at a temperature not lower than the softening point of the hot-melt adhesive. In practice, the resin board and/or the overlay film can be heated by irradiating with far-infrared heaters or by passing between a pair of hot rollers.

When a multilayered laminate consisting of, for example, an acrylic resin board and two overlay films bonded to both surfaces of the resin board or consisting of two acrylic resin boards and an overlay film sandwiched between the resin boards is desired, the above obtained laminate consisting of a resin board and an overlay film adhesively bonded together with a hot-melt adhesive layer therebetween is further bonded with another overlay film or another acrylic resin board, respectively, by repeating the procedure of steps (b) and (c).

The final step of the inventive method, i.e. step (d), has an effect of aging. Namely, the laminate obtained by the procedure of steps (a) to (c) is kept at an elevated temperature in the range from 30 to 60° C. or, preferably, from 40 to 50° C. but not higher than the softening point of the hot-melt adhesive for at least 1 hour or, preferably, for at least 2 hours. When the temperature of aging in this step is lower than 30° C., the desired stabilizing effect on the adhesive bonding strength between the acrylic resin board and the overlay film can never be obtained even by an indefinite extension of time for the treatment. When the length of time for this aging treatment is too short, the desired effect cannot be obtained as a matter of course while extention of the treatment time to exceed, for example, 20 hours gives no particular additional advantages.

Several advantages can be obtained in an overlaid acrylic resin board when it is prepared according to the inventive method including: that the acrylic resin board is free from occurrence of crazing even under the adverse influences of the plasticizer, stabilizer and the like contained in the overlay film; that occurrence of blisters in the interface between the acrylic resin board and the overlay film can be prevented so that the overlaid acrylic resin board is suitable for thermal forming and can be used with stability even in direct sunlight sometimes to cause a great elevation of the temperature of the board; that a plastic resin film having not only a printed pattern but also an embossment work can be used as the overlay film so that the variety of decorativeness can be expanded to increase the application fields of the overlaid acrylic resin boards as is the case where the overlaid resin board is under lighting in night to give a delicately shining appearance on the exquisitely embossed surface; and that the inventive method is applicable to any small lots of a multiplicity of product grades with good productivity and at low costs.

In the following, the method of the present invention is illustrated in more detail by way of examples and comparative examples. The overlaid acrylic resin boards prepared in these examples and comparative examples were evaluated by the tests for the items below. The testing procedure and criteria of evaluation in each of the testing items are as follows.

1. Air entrainment in lamination

Visual inspection was made of the overlaid acrylic resin board immediately after lamination. The results were recorded in three ratings of A, B and C when almost no air bubbles were detected between the resin board and the overlay film, when a small number of air bubbles could be recognized and when air bubbles were detected over the whole area of the board, respectively.

2. Retention of embossment work after lamination

Visual inspection was made of the overlaid acrylic resin board immediately after lamination when the overlay film had an embossment work. The results were recorded in three ratings of A, B and C when almost no changes were noted in the embossment work, when a very slight change could be noted in the embossment work and when changes in the embossment work could be clearly recognized, respectively, as compared with the embossed overlay film before lamination.

3. Warping of the board

Visual inspection was made of the overlaid resin board. The results were recorded in three ratings of A, B and C when no warping could be detected within the sensitivity of visual inspection, when very slight but clearly recognizable warping could be detected and when warping could be recognized by the first sight, respectively.

4. Crazing

The overlaid resin board was forcibly bent by applying a varied bending force to form a curved surface with the overlay film facing outwardly and kept as such for 2 hours at 75° C. followed by cooling and release of the bending force to visually inspect occurrence of crazes or cracks on the middle part in the interface between the resin board and the overlay film. The results were recorded in three ratings of A, B and C when cracks were detected only with a bending stress exceeding 150 kgf/cm$^2$, when cracks were detected only with a bending stress exceeding 80 kgf/cm$^2$ and when cracks were detected with a bending stress of 80 kgf/cm$^2$ or smaller, respectively.

5. Blistering under direct sunlight

The effect of direct sunlight irradiation was simulated by a heat treatment, in which the overlaid resin board was kept at 60° C. for 30 days to visually inspect additional occurrence of bubbles between the resin board and the overlay film. The results were recorded in three ratings of A, B and C when no additional bubbles could be detected, when a small number of additional bubbles could be detected and when a number of additional bubbles were detected over the whole area, respectively.

6. Thermal shrinkage

A 10 cm by 10 cm wide square specimen of the overlaid resin board was provided with a cross-wise incision from the overlay film reaching the underlying resin board at the center by using a sharp knife edge and heated at 100° C. for 2 hours. After cooling to room temperature, visual inspection was made for the state of the overlay film at the incised peripheries. The results were recorded in three ratings of A, B and C when the gap width between the incised peripheries of the overlay film was less than 0.5 mm, from 0.5 to 1 mm and larger than 1 mm, respectively.

7. Blistering in thermal forming

After a pre-heating treatment of the overlaid resin board at 150° C. for 30 minutes, the resin board was worked to shape a cylindrically curved form having a diameter of 100 mm with the overlay film facing outwardly and, after cooling to room temperature, visual inspection was made for the additional occurrence of bubbles between the resin board and the overlay film. The results were recorded in three ratings of A, B and C when no additional bubbles could be detected, when a small number of additional bubbles could be detected and when a number of additional bubbles were detected over the whole area, respectively.

8. Workability in machining

The overlaid resin board was gently brought into contact and pressed at the overlay film to a rotating circular saw to effect cutting of the board and the cross section of the thus divided pieces was visually inspected. The results were recorded in three ratings of A, B and C when a neat cross section was obtained without delamination or break of the overlay film, when delamination or break of the overlay film, even very slight, was found and when delamination or break of the overlay film was found along the almost whole length of the cross section, respectively.

EXAMPLE 1

A 50 cm by 50 cm wide square acrylic resin board having a thickness of 2 mm was subjected to a demoisturization treatment by heating in a hot room at 80° C. for 4 hours. Separately, a plastic resin film having an embossment work and a printed decorative pattern, which in itself was a laminate of a KFC film, which is a laminate of a polyvinylidene fluoride resin film and an acrylic resin film, and a polyvinyl chloride film having an overall thickness of 150 µm was coated on the surface of the polyvinyl chloride film with an acrylic hot-melt adhesive resin in a coating thickness of 30 µm.

The adhesive-coated overlay film was, while the surface of the adhesive layer was kept at 100° C. by contacting the film with a hot roller, was laid on the acrylic resin board, of which the surface was kept at 60° C. after heating in a hot-air oven with the surface of the adhesive layer facing the resin board and passed together between a pair of laminating rubber rollers having a diameter of 8 cm, of which the rubber had a hardness of 70 in the JIS scale, under a line pressure of 2 kgf/cm at a laminating velocity of 2 meters/minute to give an overlaid acrylic resin board, which was subjected to an aging treatment at 50° C. for 10 hours.

The results of the evaluation tests of the thus prepared overlaid resin board were that the rating A could be obtained in all of the testing items.

EXAMPLE 2

The preparation procedure of an overlaid acrylic resin board was substantially the same as in Example 1 except that:
the acrylic resin board had a thickness of 3 mm;
the overlay film had an embossment but no printed pattern;
the demoisturization treatment of the resin board was conducted at 80° C. for 10 hours;
the line pressure of the laminating rubber rollers was 7 kgf/cm;
the laminating velocity was 5 meters/minute; and
the aging treatment was conducted at 50° C. for 20 hours.

The results of the evaluation tests of the thus prepared overlaid acrylic resin board were as good as in Example 1 in all of the testing items.

EXAMPLE 3

The preparation procedure of an overlaid acrylic resin board was substantially the same as in Example 1 except that:
the acrylic resin board had a thickness of 5 mm;
the overlay film was a single polyethylene terephthalate film having a printed pattern;
the demoisturization treatment of the resin board was conducted at 80° C. for 20 hours;
the surface of the resin board in bonding was heated at 70° C.;
the plastic resin film in bonding was heated at 80° C.;
the line pressure of the laminating rubber rollers was 20 kgf/cm;
the laminating velocity was 5 meters/minute; and
the aging treatment was conducted at 50° C. for 20 hours.

The results of the evaluation tests of the thus prepared overlaid acrylic resin board were as good as in Example 1 in all of the testing items.

COMPARATIVE EXAMPLE 1

The preparation procedure of an overlaid acrylic resin board was substantially the same as in Example 1 except that:
the acrylic resin board had a thickness of 3 mm;
the overlay film was the same as used in Example 2; the demoisturization treatment of the resin board was conducted at 80° C. for 20 hours;
the resin board and the plastic resin film were introduced together into the laminating rollers at room temperature;
the line pressure of the laminating rubber rollers was 5 kgf/cm;
the laminating velocity was 1 meter/minute; and
the aging treatment was omitted.

The results of the evaluation tests of the thus prepared overlaid acrylic resin board were as shown in Table 1.

COMPARATIVE EXAMPLE 2

The preparation procedure of an overlaid acrylic resin board was substantially the same as in Example 1 except that:
the demoisturization treatment of the resin board was omitted;
the surface of the resin board in bonding was heated at 80° C.;
the line pressure of the laminating rubber rollers was 10 kgf/cm;
the laminating velocity was 15 meters/minute; and
the aging treatment was conducted at 50° C. for 20 hours.

The results of the evaluation tests of the thus prepared overlaid acrylic resin board were as shown in Table 1.

COMPARATIVE EXAMPLE 3

The preparation procedure of an overlaid acrylic resin board was substantially the same as in Example 1 except that:
the plastic resin film was a single film of a polyethylene terephthalate resin;
the hot-melt adhesive was replaced with a pressure-sensitive adhesive;
the demoisturization treatment of the resin board was omitted;
the surface of the resin board in bonding was heated at 80° C.;
the plastic resin film in bonding was heated at 80° C.;
the line pressure of the laminating rubber rollers was 2 kgf/cm;
the laminating velocity was 1 meter/minute; and
the aging treatment was conducted at 50° C. for 20 hours.

The results of the evaluation tests of the thus prepared overlaid acrylic resin board were as shown in Table 1

TABLE 1

| | Comparative Example | | |
|---|---|---|---|
| | 1 | 2 | 3 |
| Air entrainment in lamination | C | C | A |
| Retention of embossment work after lamination | A | A | — |
| Warping of the board | A | A | A |
| Crazing | A | A | A |
| Blistering under direct sunlight | B | B | A |
| Thermal shrinkage | A | A | A |
| Blistering in thermal forming | B | B | B |
| Workability in machining | C | A | A |

What is claimed is:

1. A method for adhesively bonding an overlay film of a plastic resin to the surface of an acrylic resin board with a hot-melt adhesive to prepare an overlaid acrylic resin board which comprises the steps of:

(a) heating the acrylic resin board at a temperature in the range from 50 to 100° C. for a length of time of at least two hours;

(b) forming a layer of a hot-melt adhesive on the surface of either one or both of the acrylic resin board and the plastic resin-made overlay film;

(c) bringing the acrylic resin board and the overlay film into contact with each other under pressure, the layer of the hot-melt adhesive on the resin board or on the overlay film facing the other, while at least either one of the surfaces to be brought into contact with each other is at a temperature higher than the softening point of the adhesive but not exceeding the softening point of the acrylic resin board or the plastic resin overlay film, to give a laminate of the resin board and the overlay film; and (d) keeping the laminate at a temperature in the range from 30 to 60° C. for at least one hour to effect aging.

2. The method according to claim 1 in which the heating temperature in step (a) is in the range from 60 to 90° C.

3. The method according to claim 1 in which the hot-melt adhesive is a partially crosslinked polymer of an alkyl ester of (meth)acrylic acid having a weight-average molecular weight in the range from 20,000 to 2,000,000.

4. The method according to claim 1 in which the hot-melt adhesive is an acrylic resin having a glass transition point in the range from 10 to 105° C.

5. The method according to claim 1 in which the acrylic resin board and the overlay film are brought into contact with each other in step (c) by introducing the same together between a pair of laminating rollers.

6. The method according to claim 5 in which the line pressure of the laminating rollers is in the range from 0.1 to 50 kgf/cm.

7. The method according to claim 1 in which the aging temperature in step (d) is in the range from 40 to 50° C. but not higher than the softening point of the hot-melt adhesive.

8. The method according to claim 1 in which the length of time for the aging treatment in step (d) is at least 2 hours.

* * * * *